(12) United States Patent
Simmons et al.

(10) Patent No.: US 11,142,209 B2
(45) Date of Patent: Oct. 12, 2021

(54) VEHICLE ROAD FRICTION CONTROL

(71) Applicant: Ford Global Technologies, LLC, Dearborn, MI (US)

(72) Inventors: Kyle Simmons, New Boston, MI (US); Eric Hongtei Tseng, Canton, MI (US); Michael Hafner, Ann Arbor, MI (US); Mohsen Lakehal-Ayat, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 340 days.

(21) Appl. No.: 16/273,623

(22) Filed: Feb. 12, 2019

(65) Prior Publication Data
US 2020/0255020 A1 Aug. 13, 2020

(51) Int. Cl.
| | |
|---|---|
| *B60W 40/068* | (2012.01) |
| *G08G 1/052* | (2006.01) |
| *G08G 1/16* | (2006.01) |
| *B60W 10/18* | (2012.01) |
| *G06N 20/00* | (2019.01) |
| *B60W 10/20* | (2006.01) |

(52) U.S. Cl.
CPC ......... *B60W 40/068* (2013.01); *B60W 10/18* (2013.01); *B60W 10/20* (2013.01); *G06N 20/00* (2019.01); *G08G 1/052* (2013.01); *G08G 1/167* (2013.01); *B60W 2555/20* (2020.02)

(58) Field of Classification Search
CPC .... B60W 40/068; B60W 10/18; B60W 10/20; B60W 2555/20; G06N 20/00; G08G 1/052; G08G 1/167; B60T 2210/124; B60T 8/1763
See application file for complete search history.

(56) References Cited

U.S. PATENT DOCUMENTS

| | | | | |
|---|---|---|---|---|
| 5,353,225 A | * | 10/1994 | Tsuyama | ................. B60T 8/175 180/197 |
| 5,411,322 A | * | 5/1995 | Breen | ................... B60T 8/1708 303/7 |
| 6,272,443 B1 | * | 8/2001 | Motzko | ............... B60W 40/068 702/142 |
| 8,855,923 B2 | * | 10/2014 | Haavasoja | ............. G01C 21/32 701/411 |
| 9,475,500 B2 | * | 10/2016 | Grimm | ............ G08G 1/096741 |
| 9,633,560 B1 | * | 4/2017 | Gao | ..................... G08G 1/0145 |
| 9,988,054 B2 | * | 6/2018 | Kieren | ............... B60W 40/068 |
| 10,377,380 B2 | * | 8/2019 | Williams | ................ G01S 17/58 |
| 10,752,225 B2 | * | 8/2020 | Varnhagen | .......... B60T 8/17558 |
| 11,097,711 B2 | * | 8/2021 | Yu | ......................... B60W 10/08 |
| 2005/0143889 A1 | | 6/2005 | Isaji et al. | |
| 2011/0037617 A1 | * | 2/2011 | Jang | ................. G08G 1/096783 340/905 |
| 2011/0043377 A1 | * | 2/2011 | McGrath | .......... G08G 1/096775 340/905 |

(Continued)

FOREIGN PATENT DOCUMENTS

JP 2002225691 A 8/2002

*Primary Examiner* — Angelina Shudy
(74) *Attorney, Agent, or Firm* — Frank A. MacKenzie; Bejin Bieneman PLC

(57) ABSTRACT

A road friction is determined for a road location based on a traffic speed determined from respective speeds of each of a plurality of vehicles. A vehicle can be operated based on the determined road friction.

20 Claims, 4 Drawing Sheets

(56) References Cited

U.S. PATENT DOCUMENTS

| | | | |
|---|---|---|---|
| 2012/0326856 A1* | 12/2012 | Levin | B60W 50/14 340/441 |
| 2014/0222321 A1 | 8/2014 | Petty et al. | |
| 2015/0149018 A1* | 5/2015 | Attard | G05D 1/0061 701/23 |
| 2015/0166072 A1* | 6/2015 | Powers | G08G 1/0129 701/1 |
| 2016/0133131 A1* | 5/2016 | Grimm | G08G 1/096725 701/117 |
| 2016/0379065 A1 | 12/2016 | Hartmann | |
| 2017/0101095 A1* | 4/2017 | Nilsson | B60T 7/22 |
| 2017/0101096 A1* | 4/2017 | Kim | B60W 30/18163 |
| 2017/0297564 A1* | 10/2017 | Xi | G05D 1/0088 |
| 2018/0126997 A1* | 5/2018 | Offenhaeuser | B60W 40/068 |
| 2018/0222462 A1* | 8/2018 | Varnhagen | B60T 8/17636 |
| 2020/0089243 A1* | 3/2020 | Poeppel | B60W 50/0097 |
| 2020/0172110 A1* | 6/2020 | Uemori | B60W 60/0023 |
| 2020/0180632 A1* | 6/2020 | Morita | B60W 10/06 |
| 2020/0189567 A1* | 6/2020 | Silver | B60W 10/20 |
| 2020/0223443 A1* | 7/2020 | Gonzalez Aguirre | B60W 60/00182 |
| 2020/0238999 A1* | 7/2020 | Batts | G08G 1/165 |
| 2020/0255020 A1* | 8/2020 | Simmons | B60W 10/18 |
| 2020/0307606 A1* | 10/2020 | Lellmann | B60W 30/00 |
| 2020/0384999 A1* | 12/2020 | Ohmura | B60W 40/068 |

* cited by examiner

VEHICLE ROAD FRICTION CONTROL

BACKGROUND

A friction between two adjacent surfaces, i.e., contacting or sliding against one another, is typically specified with a friction coefficient (often designated by the Greek letter $\mu$). Friction is an empirical property of the adjacent materials, i.e., depends on the composition of the materials, e.g., rubber and asphalt, as well as a presence or absence of other materials that may coat or come between the adjacent materials, e.g., ice, water, oil, etc.

Road friction is an important factor in operation of a road vehicle. Road friction, also referred to as surface friction or a coefficient of friction, is a measure of traction between a tire on a vehicle and a road surface. As an example, road friction may be measured by determining a tire-road friction coefficient between the tire and the road surface. The tire-road friction coefficient typically ranges between 0 and 1. The closer the tire-road friction coefficient is to 1, the greater the friction (e.g., traction). The closer the tire-road friction coefficient is to 0, the more slippery a road. A tire-road friction coefficient is typically some function of a road surface material and/or any substances (e.g., water, snow) on a road surface. As an example, a vehicle travelling at a specific speed may maintain traction with a road having a dry asphalt surface and a friction coefficient of 0.7, and may be more likely to lose traction with a road having an icy surface, and a friction coefficient of 0.25.

The tire-road friction coefficient can be used to determine a minimum stopping distance, i.e., a minimum distance in which a vehicle is able to decelerate from a current speed to a complete stop, and a maximum speed that the vehicle can travel without the tires skidding and/or slipping across the road surface. Surface friction can further at least partly govern vehicle speed, turning radius, etc. Therefore, it is desirable to be able to determine road surface friction as reliably and accurately as possible.

DETAILED DESCRIPTION

Figure 1:
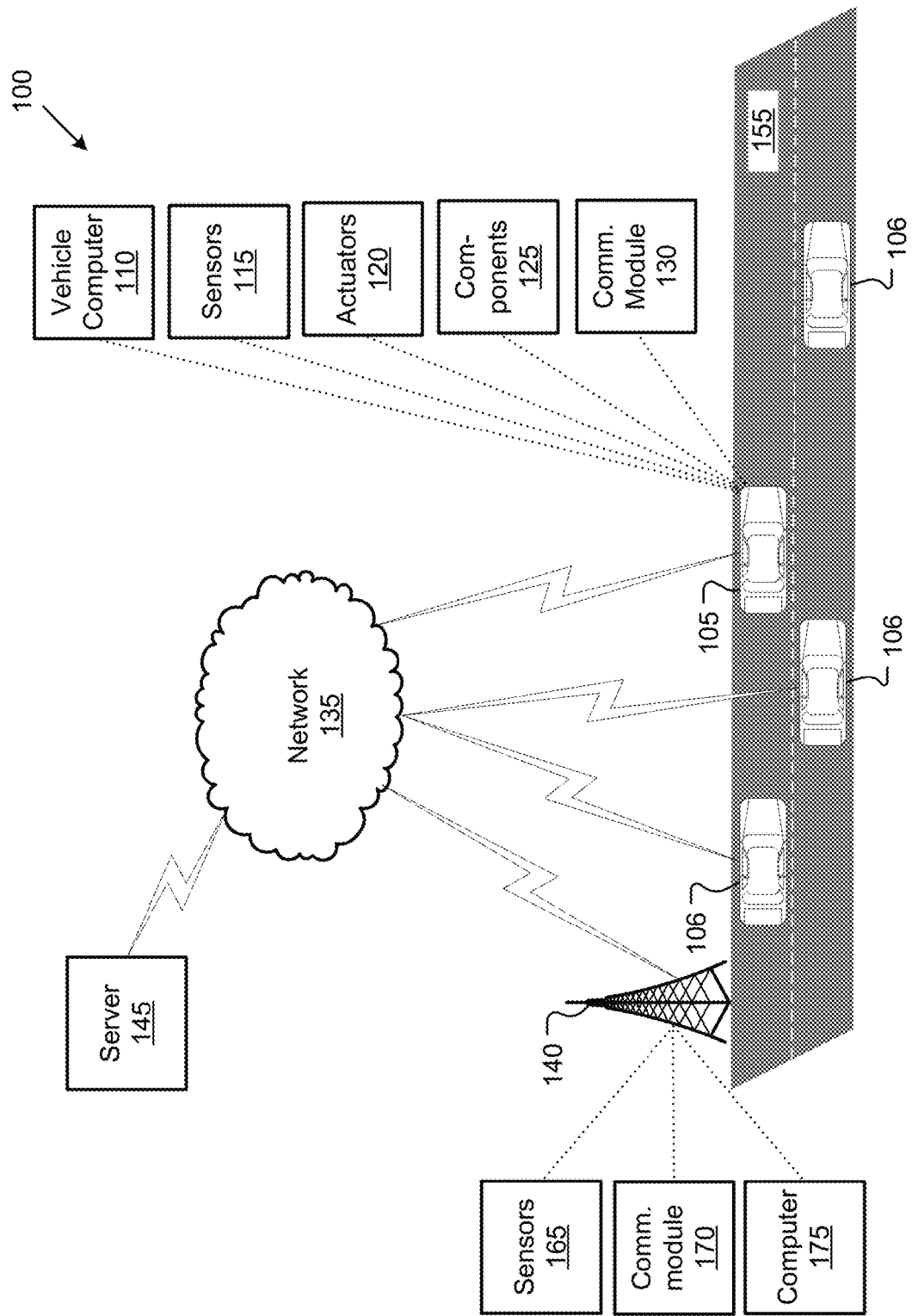
FIG. 1 is a diagram illustrating an example vehicle navigation and control system.

Disclosed herein are improved systems and methods for predicting or estimating road friction. Advantageously, road friction can be predicted before a vehicle experiences the predicted road friction, e.g., a vehicle approaching an area where a road provides low friction, i.e., is more slippery than normal, can be provided with a prediction of the low friction before the vehicle is at a location with the low friction. That is, a vehicle having a planned route that includes a specified area can obtain information about road friction in the area before the vehicle reaches the area. Vehicle sensors and/or data from an infrastructure system can provide information about speeds of other vehicles in the area, as well as information about other characteristics of the area and/or the environment. Such other information can include weather conditions, light conditions, roadway characteristics such as presence of bridges or overpasses, etc. Data relating to traffic speed and other information such as just identified can be provided as input to a machine learning program, which can then output an estimated road friction for a location or an area of a road. The estimated road friction can then be provided as input to a vehicle computer to operate a vehicle.

A method comprises determining a road friction for a road location based on a traffic speed determined from respective speeds of each of a plurality of vehicles; and operating a vehicle based on the road friction. The road friction can be determined based on, in addition to the traffic speed, a second datum that is one of whether the location includes a bridge or overpass, a status of daylight, a rain condition, a snow condition, a fog condition, a construction condition, a presence or absence of an emergency vehicle, a presence or absence of debris, or an ambient temperature. The second datum can be obtained from a map. The method can further comprise determining whether the traffic speed is below a threshold traffic speed, and providing the traffic speed determining the road friction based on the traffic speed only upon determining that the traffic speed is below the threshold traffic speed. The area can be included on a planned route for the vehicle. Operating the vehicle based on the road friction can include controlling traction, speed, steering, braking, lane keeping, or lane changing. The method Determining the road friction can include obtaining the road friction as output from a machine learning program. The machine learning program can be provided in an infrastructure node computer. The machine learning program can be provided in a computer in the vehicle. The method can further comprise providing the traffic speed and the second datum for an area that includes the road location, whereby the road friction is provided for the area; wherein the area is defined according to a starting point and an ending point of a segment of a road.

A computer comprises a processor and a memory, the memory storing instructions executable by the processor such that the computer is programmed to determine a road friction for a road location based on a traffic speed determined from respective speeds of each of a plurality of vehicles; and operate a vehicle based on the road friction. The computer can be further programmed to determine the road friction based on, in addition to the traffic speed, a second datum that is one of whether the location includes a bridge or overpass, a status of daylight, a rain condition, a snow condition, a fog condition, a construction condition, a presence or absence of an emergency vehicle, a presence or absence of debris, or an ambient temperature. The computer can be further programmed to obtain the second datum from a map. The computer can be further programmed to determine whether the traffic speed is below a threshold traffic speed, and provide the traffic speed determining the road friction based on the traffic speed only upon determining that the traffic speed is below the threshold traffic speed. The area can be included on a planned route for the vehicle. Operating the vehicle can be based on the road friction includes controlling traction, speed, steering, braking, lane keeping, or lane changing. Determining the road friction can include obtaining the road friction as output from a machine learning program. The machine learning program can be provided in an infrastructure node computer. The can further comprise programming to execute the machine learning program. The computer can be further programmed to provide the traffic speed an area that includes the road location, whereby the road friction is provided for the area; wherein the area is defined according to a starting point and an ending point of a segment of a road.

FIG. 1 is a block diagram of an example vehicle control system 100. The system 100 includes a vehicle 105, which is a land vehicle such as a car, truck, etc. The vehicle 105 includes a vehicle computer 110, vehicle sensors 115, actuators 120 to actuate various vehicle components 125, and a vehicle communications module 130. Via a network 135, the communications module 130 allows the vehicle computer 110 to communicate with one or more data collection or infrastructure nodes 140, a central server 145 and/or one or more second vehicles 106.

The vehicle computer 110 includes a processor and a memory. The memory includes one or more forms of computer-readable media, and stores instructions executable by the vehicle computer 110 for performing various operations, including as disclosed herein.

The vehicle computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the vehicle computer 110 may communicate, via the vehicle 105 communications module 130, with a navigation system that uses the Global Position System (GPS). As an example, the vehicle computer 110 may request and receive location data of the vehicle 105. The location data may be in a known form, e.g., geo-coordinates (latitudinal and longitudinal coordinates)

The vehicle computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the vehicle computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the vehicle computer 110 actually comprises a plurality of devices, the vehicle 105 communications network may be used for communications between devices represented as the vehicle computer 110 in this disclosure. Further, as mentioned below, various controllers and/or vehicle sensors 115 may provide data to the vehicle computer 110.

Vehicle sensors 115 may include a variety of devices such as are known to provide data to the vehicle computer 110. For example, the vehicle sensors 115 may include Light Detection And Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105, including objects on and/or conditions of a roadway 155. As another example, one or more radar sensors 115 fixed to vehicle 105 bumpers may provide data to provide and range velocity of objects (possibly including second vehicles 106), etc., relative to the location of the vehicle 105. The vehicle sensors 115 may further alternatively or additionally, for example, include camera sensor(s) 115, e.g. front view, side view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the vehicle computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to an infrastructure node 140 (typically via direct radio frequency communications) and/or (typically via the network 135) a remote server 145. The module 130 could include one or more mechanisms by which the vehicle computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 includes one or more mechanisms by which a vehicle computer 110 may communicate with an infrastructure node 140, a central server 145, and/or a second vehicle 150a. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure node 140 includes a physical structure such as a tower or other support structure (e.g., a pole, a box mountable to a bridge support, cell phone tower, road sign support, etc.) on which infrastructure sensors 165, as well as an infrastructure communications module 170 and computer 175 can be mounted, stored, and/or contained, and powered, etc. One infrastructure node 140 is shown in FIG. 1 for ease of illustration, but the system 100 could and likely would include tens, hundreds, or thousands of nodes 140. The infrastructure node 140 is typically stationary, i.e., fixed to and not able to move from a specific geographic location. The infrastructure sensors 165 may include one or more sensors such as described above for the vehicle 105 sensors 115, e.g., lidar, radar, cameras, ultrasonic sensors, etc. The infrastructure sensors 165 are fixed or stationary. That is, each sensor 165 is mounted to the infrastructure node so as to have a substantially unmoving and unchanging field of view.

An area included on a road surface map provided by an infrastructure node 140, i.e., the area referred to as the area "proximate" to the node 140, is typically defined by an area within a field of view of one or more node sensors 165. The word "area" as used herein should be understood to have its plain and ordinary geometric meaning, i.e., a region defined by a boundary that is defined by three or more points. For example, a triangular area is defined by boundary lines connecting the three vertex points of a triangle. A circular area is defined by a boundary circle that is defined by and points of a radius extending from the center of the circle. Irregular areas, i.e., areas defined partly or entirely without regular geometric shapes, can likewise be specified. Returning to the present example, an area proximate to an infrastructure node 140 may be substantially circular, i.e., defined by a radius whose length is determined according to a range of node 140 sensors 165. Likewise, an area proximate to a vehicle 105 may be a rectangular area defined by side boundaries of a road 155 and forward and aft sensing ranges of vehicle 105 sensors 115. Moreover, an area on a vehicle 105 route may be a specified segment of a road 155. Such route area may be defined, i.e. have boundaries specified, according to a starting point and an ending point of the segment and side boundaries of the road 155 between the starting and ending points.

The communications module 170 and computer 175 typically have features in common with the vehicle communications module 130 and vehicle computer 110, and therefore will not be described further to avoid redundancy. Although not shown for ease of illustration, the infrastructure node 140 also includes a power source such as a battery, solar power cells, and/or a connection to a power grid.

An infrastructure node 140 computer 175 and/or vehicle 105 computer 110 can receive sensor 115, 165 data to monitor one or more objects. An "object," in the context of this disclosure, is a physical, i.e., material, structure detected by a vehicle sensor 115 and/or infrastructure sensor 165. An object may be a "mobile" object, an infrastructure object, or a physical feature. A physical feature is a physical attribute or condition of a location or area, including an attribute or condition of an infrastructure object, such as a surface condition of a road 155 (e.g., the road 155 is an infrastructure object and the physical feature could be a surface coating such as water or ice, a deformation such as a pothole, etc.).

A "mobile" object is an object that is capable of moving, even though the mobile object may or not be actually moving at any given time. Vehicles 105, 106 are examples of mobile objects. Other examples could include an animal, a bicycle, a pedestrian, etc. A "mobile" object is so designated for convenience to distinguish from infrastructure objects and physical features, each discussed below. An infrastructure object is an object that, typically by design, is fixed and/or remains stationary. For example, infrastructure objects can include a road 155, a bridge or overpass, a road sign, an exit ramp, a guard rail, a traffic light, etc.

The server 145 can be a conventional computing device, i.e., including one or more processors and one or more memories, programmed to provide operations such as disclosed herein. Further, the server 145 can be accessed via the network 135, e.g., the Internet or some other wide area network.

The infrastructure node 140 computer 175 can include a memory or other storage with map data describing an area (e.g., within a predetermined radius such as 100 meters, 300 meters, etc.) around the node 140. For example, such map data could be received and/or periodically updated from a central server 145, by a technician servicing the node 140, etc. Map data typically includes geo-coordinates defining fixed or stationary objects 155, e.g., a road 155, a crosswalk, a road marking (such as a center stripe, etc.), as well as of physical features such as a slippery location, a location with a specified road bank, a location with a pothole, etc.

Further, the computer 175 can receive various data from the node 140 sensors 165 as well as, e.g., via V2X communications, from vehicle 105 sensors 115. Image data is digital image data, e.g., comprising pixels with intensity and color values, can be acquired by camera sensors 115, 165. lidar data typically includes conventional lidar point cloud data acquired by lidar sensors 115, 165, i.e., including data describing points in three dimensions, that is, each point representing a location of a surface of an object 150, 155, 160.

A vehicle computer 110 and/or a node computer 175 can receive and analyze data from sensors 115, 165 substantially continuously, periodically, and/or when instructed by a server 145, etc. Further, conventional object classification or identification techniques can be used, e.g., in a computer 110, 175 based on lidar sensor 115, 165, camera sensor 115, 165, etc., data, to identify a type of object, e.g., vehicle, person, rock, pothole, bicycle, motorcycle, etc., as well as physical features of objects.

Various techniques such as are known may be used to interpret sensor 115, 165 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input an image and then provide as output, for each of one or more respective regions of interest in the image, an indication of one or more objects or an indication that no object is present in the respective region of interest. Further, a coordinate system (e.g., polar or cartesian) applied to an area proximate to a vehicle 105 and/or a node 140 can be applied to specify locations and/or areas (e.g., according to the vehicle 105 or node 140 coordinate system, translated to global latitude and longitude geo-coordinates, etc.) of objects identified from sensor 115, 165 data. Yet further, a computer 110, 175 could employ various techniques for fusing data from different sensors 115, 165 and/or types of sensors 115, 165, e.g., lidar, radar, and/or optical camera data.

Figure 2:
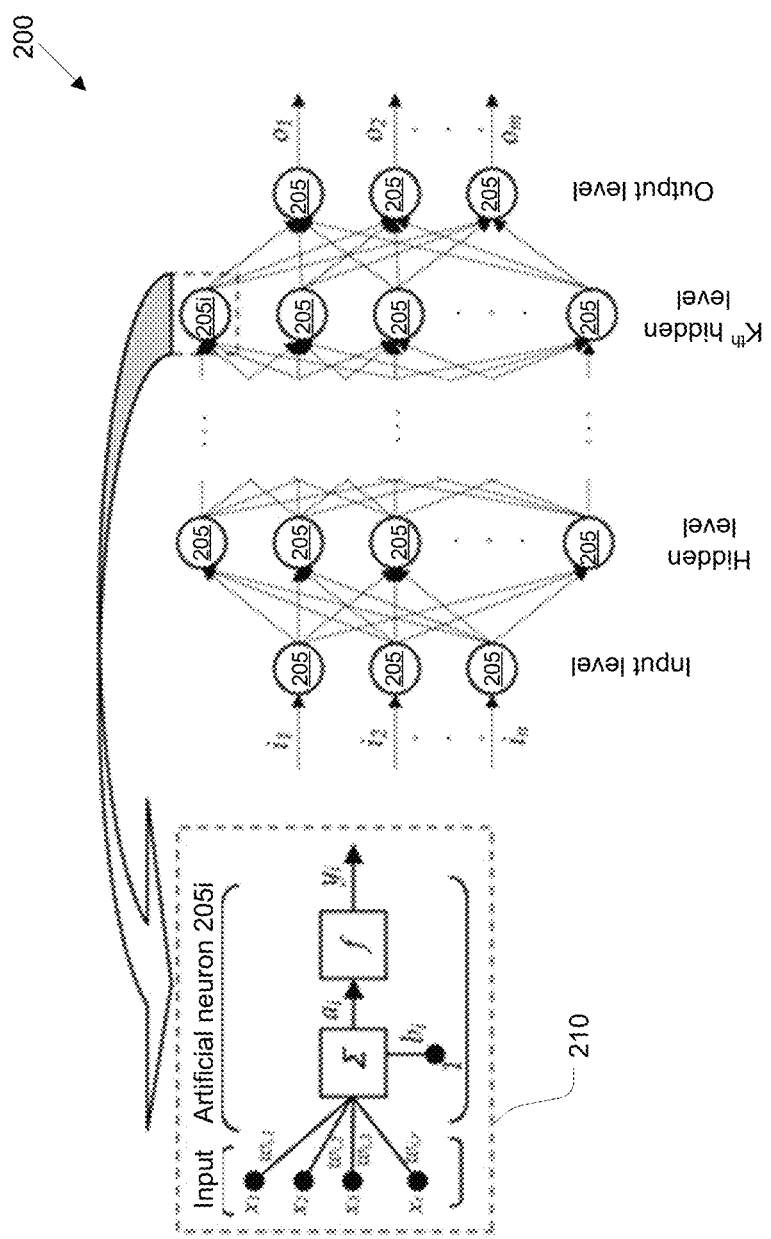
FIG. 2 is a diagram of an example deep neural network.

Computers 110, 175 can predict or estimate road friction according to a machine learning program. FIG. 2 is a diagram of an example deep neural network (DNN) 200. The DNN 200 can be a software program that can be loaded in memory and executed by a processor included in computer 110, 175, for example. The DNN 200 can include n input nodes 205, each accepting a set of inputs i (i.e., each set of inputs i can include on or more inputs x). The DNN 200 can include m output nodes (where m and n may be, but typically are not, a same number) provide sets of outputs $o_1 \ldots o_m$. The DNN 200 includes a plurality of layers, including a number k of hidden layers, each layer including one or more nodes 205. The nodes 205 are sometimes referred to as artificial neurons 205, because they are designed to emulate biological, e.g., human, neurons. The neuron block 210 illustrates inputs to and processing in an example artificial neuron 205$i$. A set of inputs $x_1 \ldots x_r$ to each neuron 205 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 205$i$ output $y_i$. The activation function $f$ can be a variety of suitable functions, typically selected based on empirical analysis. As illustrated by the arrows in FIG. 2, neuron 205 outputs can then be provided for inclusion in a set of inputs to one or more neurons 205 in a next layer.

The DNN 200 can be trained to accept as inputs sensor 115 and/or sensor 165 data, e.g., from the vehicle 101 CAN bus or other network, from node 140 sensors 165, etc., and to output an estimated road friction. The DNN 200 can be trained with ground truth data, i.e., data about a real-world condition or state. Weights w can be initialized by using a Gaussian distribution, for example, and a bias b for each node 205 can be set to zero. Training the DNN 200 can including updating weights and biases via conventional techniques such as back-propagation with optimizations. Example initial and final (i.e., after training) parameters (parameters in this context being weights w and bias b) for a node 205 in one example were as follows:

TABLE 1

| Parameters | Initial value | Final value |
|---|---|---|
| $w_1$ | 0.902 | −0149428 |
| $w_2$ | −0.446 | −0.0102792 |
| $w_2$ | 1.152 | 0.00850074 |
| $w_r$ | 0.649 | 0.00249599 |
| $b_i$ | 0 | 0.00241266 |

A set of weights w for a node 205 together are a weight vector for the node 205. Weight vectors for respective nodes 205 in a same layer of the DNN 200 can be combined to form a weight matrix for the layer. Bias values b for respective nodes 205 in a same layer of the DNN 200 can be combined to form a bias vector for the layer. The weight matrix for each layer and bias vector for each layer can then be used in the trained DNN 200.

In the present context, the ground truth data used to train the DNN 200 typically includes data specifying speeds or an average speed of vehicles 106 in an area, e.g., within a specified distance, e.g., 500 meters, of a vehicle 105 on a roadway 155, along with data about an environment in the area. Table 2 below identifies further possible inputs to the DNN 200:

TABLE 2

| Input | Definition | Data type |
|---|---|---|
| OnBridge | Does the road 155 on which the vehicle 105 is traveling include a bridge (more likely to ice) | binary |
| Daylight | Is the vehicle 105 traveling in normal daylight conditions | binary |
| Rain | Is rain falling? | binary |
| Snow | Is snow falling? | binary |
| Fog | Is fog present? | binary |
| Construction | Is the vehicle 105 traveling in a construction zone? | binary |
| Emergency vehicle | Is an emergency vehicle present on a same road as the vehicle 105? | binary |
| Debris | A rating indicating an amount of debris such as rocks, gravel, branches, etc., on a roadway 155, e.g., could be a scale of 0 to 10 where 0 means no debris, and 10 means a road is wholly impassable. | integer |
| Ambient temperature | Temperature of air outside the vehicle 105, typically in degrees centigrade | real number |

Thus, a DNN 200 could be trained by obtaining data specifying inputs such as above along with respective road frictions associated with various combinations of inputs. Advantageously, problems that arise not only from being unable to estimate friction for a location or area until a vehicle 105 is at the location or area, and/or from estimating friction solely from a speed or speeds of vehicles 106 at the location or area, can be avoided. For example, vehicles 106 may slow for an emergency vehicle, for construction, based on weather conditions or ambient light conditions, even when road friction is not reduced. Accordingly, processing such additional inputs through a machine learning program such as DNN 200 can provide a more accurate and reliable determination of road friction.

Figure 3:
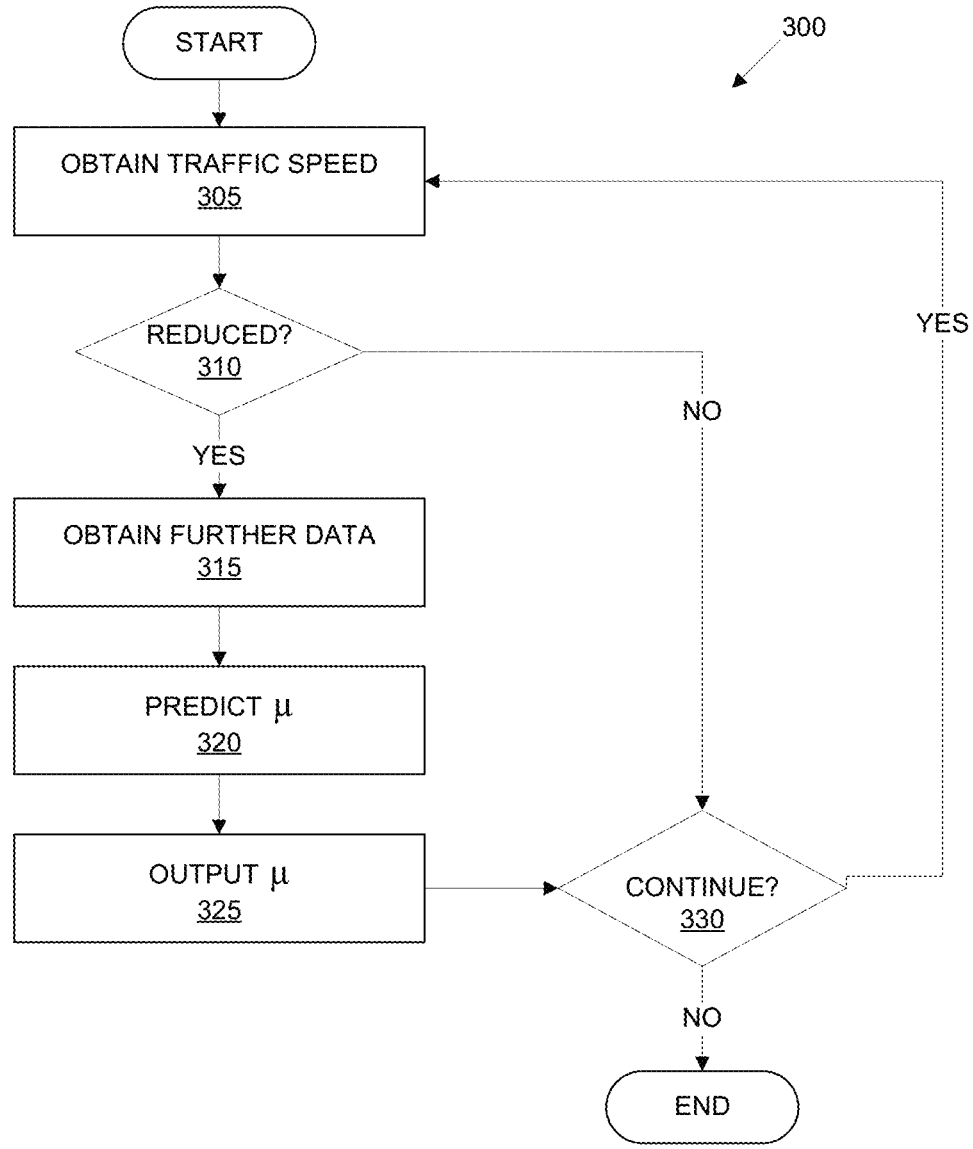
FIG. 3 is a flowchart of an exemplary process for estimating or predicting a road friction and operating a vehicle according to the predicted road friction.

FIG. 3 is a flowchart of an exemplary process 300 for estimating or predicting a road friction and operating a vehicle according to the predicted road friction. Blocks of the process 300 could be executed by a vehicle computer 110 or a node computer 175.

The process 300 begins in a block 305, in which the computer 110, 175 obtains speed data for each of a plurality of vehicles 106 in an area, which speed data is then aggregated to determine a traffic speed. This aggregated speed data can be referred to as traffic speed because it represents an average or other representation (e.g., some statistical measure other than an average) of speeds of two or more vehicles 106 in the area. For example, a computer 110 could obtain speed data, e.g., an average speed of vehicles 106, for an upcoming area of a vehicle 105 route from a server 145, e.g., according to presently existing applications that collect and report vehicle speed data for areas of roads 155. In another example, a node computer 175 could obtain sensor 165 data indicating respective speeds of vehicles 106 proximate to the node 140. The computer 175 could then provide an average vehicle 106 speed for the area for a period of time in which speeds were monitored, e.g., one minute, two minutes, etc. Note that determining traffic speed based on average speed or the like of vehicles 106 does not require, or typically include, determining a derivative of vehicle 106 speed, i.e., positive or negative acceleration. However, determining traffic speed based on respective speeds of a plurality of vehicle 106 is a prerequisite to predicting a single value for road friction for a location as in the block 320, discussed below, i.e., the predicted friction coefficient is for a location or area of a road, not for a specific vehicle or vehicles 106.

Next, in a block 310, the computer 110, 175 could determine whether the traffic speed determined in the block 305 is below a specified threshold speed. For example, the specified threshold speed could be based on a speed limit for the area, e.g., the threshold could be the speed limit or could be a specified amount, e.g., five or ten percent, above or below the speed limit. If the traffic speed is not below the threshold speed, then the process 300 proceeds to a block 330, discussed below. Otherwise, the process 300 proceeds to a block 315.

The block 310 could be omitted, e.g., the block 305 discussed above and the block 315 discussed below could be combined. It is even possible that the blocks 305 and 310 could be omitted, i.e., that road friction could be predicted by a machine learning program as described herein without traffic speed as an input. However, if a traffic speed is at a normal or expected speed, then it is likely that road friction is not reduced or abnormal, and the computer 110, 175 need not expend processing cycles to predict road friction as described with respect to the remainder of the process 300.

In the block 315, the computer 110, 175 obtains second data, i.e., inputs for a machine learning program other than the traffic speed described with respect to the block 305. Such inputs could include data as described with respect to Table 2 above. Further, the computer 110, 175 could obtain data, e.g., relating to ambient temperature, presence or absence of precipitation, ambient light, and etc., from sensors 115, 165. Likewise, data about a road 155 characteristic, i.e., a physical feature of a road 155, such as whether an area of the road 155 includes a bridge, could be obtained from map data and/or camera sensor 115, 165 data, e.g., of a sign indicating a presence of a bridge or other physical feature (such as a speed bump or the like) or of an image of such physical feature that could be identified using image recognition techniques. Yet further alternatively or additionally, second data could be obtained from a server 145, e.g., reporting on weather conditions, locations or areas of construction zones, planned or current routes of emergency vehicles, etc.

Next, in the block 320, the computer 110, 175 provides the second data and typically also the traffic speed as inputs to a trained machine learning program such as DNN 200, which then predicts a road friction μ, and then provides the road friction as output in a block 325. The output road friction can then be used to operate a vehicle 105, e.g., as described with respect to FIG. 4.

In the block 330, which can follow either of the blocks 310, 325, the computer 110, 175 determines whether the process 300 should continue. For example, a vehicle computer 110 could continue if the vehicle 105 continues operations, i.e., continues to travel on a road 155, and could return to the block 305 to determine an estimated or predicted road friction for a second or subsequent area of a vehicle 105 route. Further, a computer 110, 175 could estimate or predict a road friction for an area for a second or subsequent period of time. If the process 300 is to continue, the process 300 returns to the block 305. Otherwise, the process 300 ends following the block 330.

Figure 4:
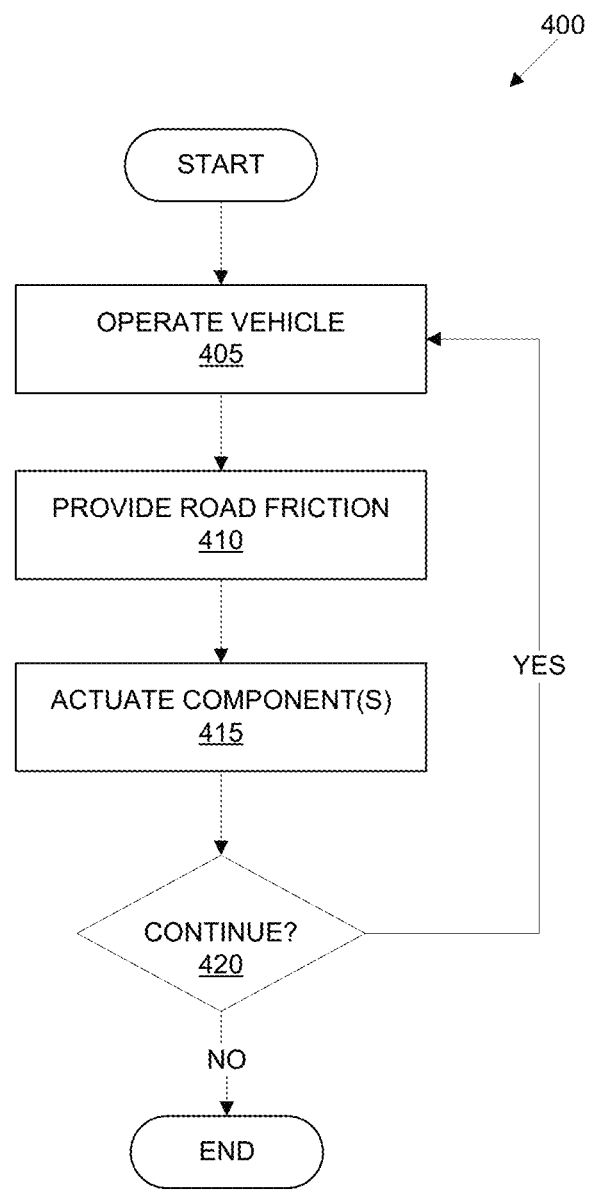
FIG. 4 illustrates an example process 400 to operate a vehicle 105 according to an estimated or predicted road friction.

FIG. 4 illustrates an example process 400 to operate a vehicle 105 according to a road friction estimated or predicted as described above, e.g., with respect to the process 300. The process 400 could be executed according to instructions stored in a memory of a vehicle computer 110.

The process 400 begins in a block 405, in which, as the vehicle 105 operates in an area or at a location for which road friction has been provided as described with respect to the process 300.

Next, in a block 410, the computer 110 provides the road friction from the process 300 to one or more components 125. For example, a traction control system, a lane keeping system, a lane change system, speed management, etc., could all be operated based at least in part on road friction. For example, certain driver assist systems such as lane-change or brake assist could be completely disabled when the road friction estimate was below a threshold, or a different calibration could be used to allow features to operate more conservatively. In another example, vehicles 105 with selectable terrain management functionality could be automatically switched into "snow mode" in low road friction scenarios. Yet further, for example, vehicle 105 features allowing a semi-autonomous "hands-off" mode in which an operator could have hands off a steering wheel could be disabled when the road friction estimate was below a threshold.

Next, in a block 415, the computer 110 operates the vehicle 105 by actuating the components 125 according to the road friction from the process 300.

Next, in a block 420, the computer 110 determines whether to continue the process 400, e.g., whether the vehicle 105 continues operations, is proceeding to a subsequent area for which a new road friction should be determined, etc. If the process 400 is to continue, the process 400 returns to the block 405. Otherwise, the process 400 ends following the block 420.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc. The word "substantial" should be similarly understood.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
 determining a road friction for a road location based on a traffic speed determined from respective speeds of each of a plurality of vehicles;
 determining whether the traffic speed is below a threshold traffic speed, and determining the road friction based on the traffic speed only upon determining that the traffic speed is below the threshold traffic speed; and
 operating a vehicle based on the road friction.

2. The method of claim 1, wherein the road friction is determined based on, in addition to the traffic speed, a second datum that is one of whether the location includes a bridge or overpass, a status of daylight, a rain condition, a snow condition, a fog condition, a construction condition, a presence or absence of an emergency vehicle, a presence or absence of debris, or an ambient temperature.

3. The method of claim 2, further comprising obtaining the second datum from a map.

4. The method of claim 2, further comprising providing the traffic speed and the second datum for an area that includes the road location, whereby the road friction is provided for the area; wherein the area is defined according to a starting point and an ending point of a segment of a road.

5. The method of claim 1, wherein the area is included on a planned route for the vehicle.

6. The method of claim 1, wherein operating the vehicle based on the road friction includes controlling traction, speed, steering, braking, lane keeping, or lane changing.

7. The method of claim 1, wherein determining the road friction includes obtaining the road friction as output from a machine learning program.

8. The method of claim 7, wherein the machine learning program is provided in an infrastructure node computer.

9. The method of claim 7, wherein the machine learning program is provided in a computer in the vehicle.

10. A computer comprising a processor and a memory, the memory storing instructions executable by the processor such that the computer is programmed to:
- determine a road friction for a road location based on a traffic speed determined from respective speeds of each of a plurality of vehicles;
- determine whether the traffic speed is below a threshold traffic speed, and determine the road friction based on the traffic speed only upon determining that the traffic speed is below the threshold traffic speed; and
- operate a vehicle based on the road friction.

11. The computer of claim 10, further programmed to determine the road friction based on, in addition to the traffic speed, a second datum that is one of whether the location includes a bridge or overpass, a status of daylight, a rain condition, a snow condition, a fog condition, a construction condition, a presence or absence of an emergency vehicle, a presence or absence of debris, or an ambient temperature.

12. The computer of claim 11, further programmed to obtain the second datum from a map.

13. The computer of claim 11, further programmed to provide the traffic speed and the second data for an area that includes the road location, whereby the road friction is provided for the area; wherein the area is defined according to a starting point and an ending point of a segment of a road.

14. The computer of claim 10, wherein the area is included on a planned route for the vehicle.

15. The computer of claim 10, wherein operating the vehicle based on the road friction includes controlling traction, speed, steering, braking, lane keeping, or lane changing.

16. The computer of claim 10, wherein determining the road friction includes obtaining the road friction as output from a machine learning program.

17. The computer of claim 16, wherein the machine learning program is provided in an infrastructure node computer.

18. The computer of claim 16, further comprising programming to execute the machine learning program.

19. A computer comprising a processor and a memory, the memory storing instructions executable by the processor such that the computer is programmed to:
- determine whether the traffic speed is below a threshold traffic speed, the traffic speed being determined from respective speeds of each of a plurality of vehicles;
- upon determining the traffic speed is below the threshold traffic speed, determine a second datum that is one of whether the location includes a bridge or overpass, a status of daylight, a rain condition, a snow condition, a fog condition, a construction condition, a presence or absence of an emergency vehicle, a presence or absence of debris, or an ambient temperature;
- determine the road friction based on the second datum; and
- operate a vehicle based on the road friction.

20. The computer of claim 19, further programmed to determine the road friction based on, in addition to the second datum, the traffic speed.

\* \* \* \* \*